United States Patent [19]
Nobutsugu

[11] Patent Number: 4,790,398
[45] Date of Patent: Dec. 13, 1988

[54] COMBINATORIAL WEIGHING METHOD AND APPARATUS THEREFOR

[75] Inventor: Hideo Nobutsugu, Kyoto, Japan

[73] Assignee: Kabushiki Kaisha Ishida Koki Seisakusho, Kyoto, Japan

[21] Appl. No.: 149,891

[22] Filed: Jan. 27, 1988

Related U.S. Application Data

[63] Continuation of Ser. No. 942,926, Dec. 17, 1986, abandoned, which is a continuation of Ser. No. 687,020, Dec. 28, 1984, abandoned.

[30] Foreign Application Priority Data

Dec. 28, 1983 [JP] Japan ................................ 58-251707

[51] Int. Cl.$^4$ ...................... G01G 13/00; G01G 23/10
[52] U.S. Cl. .......................................... 177/1; 177/25; 177/185
[58] Field of Search ................ 177/1, 25, 18, 50, 185, 177/DIG. 12

[56] References Cited

U.S. PATENT DOCUMENTS

| | | | |
|---|---|---|---|
| 4,379,495 | 4/1983 | Cocks et al. | 177/1 |
| 4,385,671 | 5/1983 | Hirano | 177/25 |
| 4,466,500 | 8/1984 | Mosher et al. | 177/25 X |

Primary Examiner—George H. Miller, Jr.
Attorney, Agent, or Firm—Staas & Halsey

[57] ABSTRACT

A combinatorial weighing method includes reading and storing output data from a plurality of weighing machines, and monitoring the weighing state of each weighing machine at all times on the basis of the stored data. When performing a combinatorial calculation, weight data from weighing machines in a stable state is read and these weight data participate in the combinatorial calculation. A combinatorial weighing apparatus for practicing the foregoing method has a reading circuit for constantly reading output data from each of the weighing machines, a memory for storing the read data, a sensing circuit for sensing whether each weighing machine is in a stable state based on the stored data, and an arithmetic circuit for executing a combinatorial calculation based upon weight data from those weighing machines in a stable state.

14 Claims, 4 Drawing Sheets

COMBINATORIAL WEIGHING METHOD AND APPARATUS THEREFOR

This is a continuation of co-pending application Ser. No. 942,926 filed on Dec. 17, 1986. which is a continuation of Ser. No. 687,020 filed Dec. 28, 1984 both now abandoned.

BACKGROUND OF THE INVENTION

This invention relates to a combinatorial weighing system. More particularly, the invention relates to a novel combinatorial weighing method capable of raising weighing speed, and to a combinatorial weighing apparatus for practicing such method.

A combinatorial weighing apparatus operates by supplying a plurality of weighing machines with articles to be weighed, computing combinations based on weight values obtained from the weighing machines, selecting a combination giving a total combined weight value equal or closest to a target weight, and discharging the articles solely from those weighing machines corresponding to the selected combination, thereby providing a batch of weighed articles of a weight equal or closest to the target weight.

Figure 1:
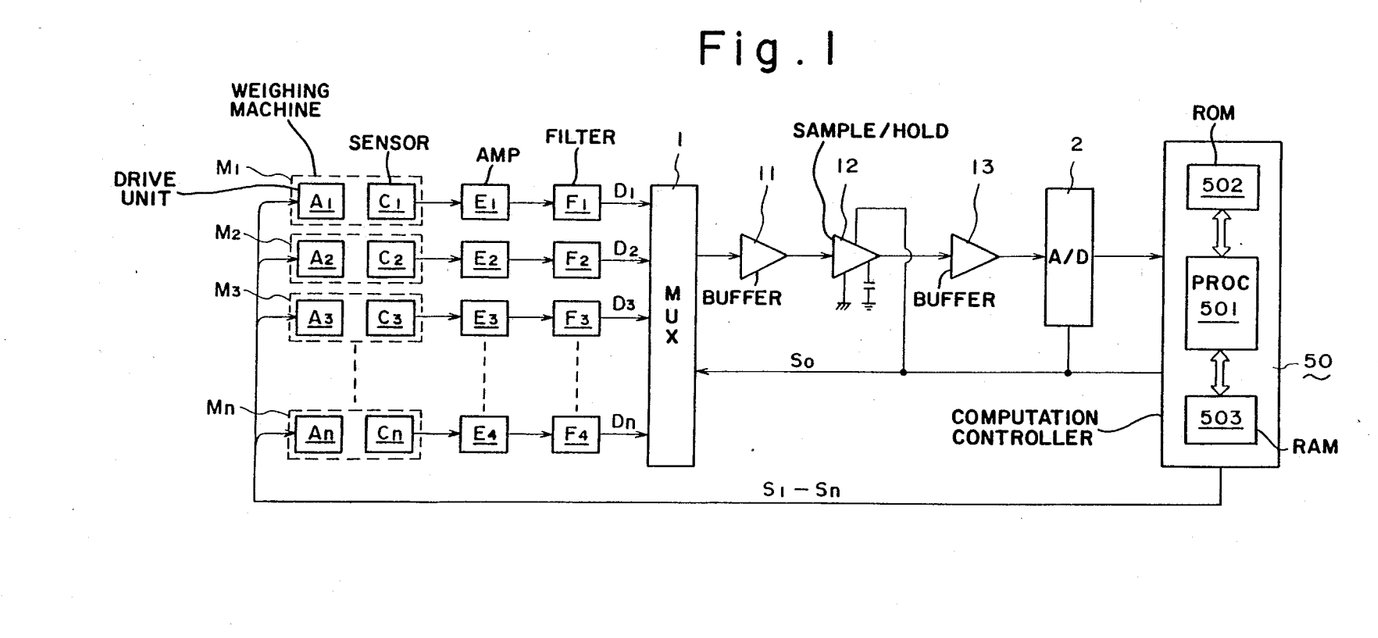
FIG. 1 is a block diagram of the general construction of a control system of a combinatorial weighing apparatus.

The control system of such a combinatorial weighing apparatus will now be described in brief with reference to FIG. 1. The apparatus includes n-number of weighing machines $M_1$ through $M_n$ respectively comprising weight sensors $C_1$ through $C_n$, each of which is constituted by, e.g., a load cell, and weighing hoppers, not shown, attached to the weight sensors. The weighing hoppers of the weighing machines $M_1$ through $M_n$ are so adapted as to be opened and closed by respective drive units $A_1$ through $A_n$ controlled by a computation controller 50, described below. The weight sensors $C_1$ through $C_n$ sense the weight of articles introduced into the respective weighing hoppers, each weight sensor producing a weight signal, namely an analog value corresponding to the weight sensed thereby. The weight signals from these weight sensors $C_1$ through $C_n$ are applied as multiple input signals $D_1$ through $D_n$ to a multiplexer 1 via amplifier circuits $E_1$ through $E_n$ and filters $F_1$ through $F_n$, respectively. The multiplexer 1, which is composed of analog switches or the like, responds to a selection command $S_o$ from the computation controller 50 by selectively applying the weight signals $D_1$ through $D_n$ as weight data to a buffer circuit 11 in sequential fashion. The buffer circuit 11 delivers the weight data signals $D_1$ through $D_n$ received from the multiplexer 1 to a sample/hold circuit 12 upon subjecting the signal to an impedance conversion. The sample/hold circuit 12 repeatedly samples and holds the weight data signals $D_1$ through $D_n$ subjected to the impedance conversion by the buffer circuit 11, and delivers the weight data signals to a buffer circuit 13. The latter subjects the signals to an impedance conversion, producing analog weight data signals delivered to an analog-digital converter (A/D converter) 2. The latter converts the analog weight data signals from the buffer circuit 13 into digital signals applied to the computation controller 50. The latter is composed of a microcomputer and includes a processor 501 for performing combinatorial calculations, a read-only memory (ROM) 502 storing a control program for combinatorial processing, and a random-access memory (RAM) 503 for storing the weight data as well as the results of processing performed by the processor 501. The computation controller 50 computes combinations on the basis of the weight data, selects a combination, referred to as the "optimum combination", giving a total combined weight value equal or closest to a target weight, and delivers discharge commands $S_1$ through $S_n$ to the drive units $A_1$ through $A_n$ of respective weighing hoppers belonging to those weighing machines $M_1$ through $M_n$ which correspond to the selected combination.

Since a combinatorial weighing apparatus of the foregoing type is based on static weighing, the weighing machines $M_1$ through $M_n$ must attain a quiescent, stabilized state by the time the computation controller 50 reads the weight data $D_1$ through $D_n$ delivered by these weighing machines. Accordingly, in the conventional combinatorial weighing apparatus, a timer is set to a time period within which the weighing machines are expected to stabilize, and the timer is started at the exact instant the loading of the articles into the weighing hoppers of the weighing machines is completed. When the set time period has expired, the timer issues a signal in response to which the computation controller 50 sends the selection command $S_o$ to the multiplexer 1 and reads in the weight data $D_1$-$D_n$ from the weighing machines $M_1$-$M_n$.

To maintain good weighing accuracy, the aforementioned time period must be set with some margin for safety. Even though weighing machines may actually stabilize early, therefore, the weight data cannot be read until the set time period has fully expired. Accordingly, weighing speed with the conventional arrangement is limited by the time period to which the timer has been set and is difficult to raise without diminishing weighing accuracy. Furthermore, with the conventional weighing system, there is no confirmation that the weighing machines have actually stabilized when the weight data are read. For this reason, reading of the weight data cannot be inhibited in the event that the quiescent state of the weighing machines is upset by an external disturbance, such as floor vibration, which occurs during the reading operation.

SUMMARY OF THE INVENTION

An object of the present invention is to provide a combinatorial weighing method and a combinatorial weighing apparatus therefor, whereby both weighing accuracy and weighing speed can be raised.

Another object of the present invention is to provide a novel combinatorial weighing method and a combinatorial weighing apparatus therefor, whereby weighing errors can be prevented from occurring even when weighing machine stability is disturbed, as by floor vibration during the reading of weight data.

According to the present invention, the foregoing objects are attained by providing a combinatorial weighing method having steps of constantly reading and storing output data produced by a plurality of weighing machines, constantly monitoring the weighing states of the weighing machines on the basis of the stored data to sense whether the weighing machines are in a stable state, and performing a combinatorial calculation upon reading weight data from those machines sensed to have attained a stable state.

The present invention also provides a combinatorial weighing apparatus for practicing the foregoing method, the apparatus comprising reading means for constantly outputting weight data produced by a plurality of weighing machines, memory means for storing, for each and every weighing machine, a predetermined number of items of the output data read by the reading means, sensing means for sensing whether weighing machines are in a stable state based on the predetermined number of items of output data stored in the memory means, and arithmetic means for executing a combinatorial calculation upon reading, from the memory means, weight data from those weighing machines in the stable state.

According to the present invention, the weighing state of each weighing machine is monitored at all times by constantly reading the data delivered by each weighing machine. When a combinatorial calculation is performed, weight data are read from those weighing machines in a quiescent, stable state and those weight data are made to participate in the combinatorial computation. Accordingly, the risks involved in judging weighing machine stabilization based on an advance prediction can be avoided and the weight data can be read when actual stabilization has been achieved (which may take place sooner than the time estimated). Consequently, both weighing accuracy and weighing speed can be raised in comparison with the prior art. In addition, the arrangement of the present invention is such that each value to be used in a combinatorial calculation is a mean value determined by processing a predetermined number of the latest weight data samples for a weighing machine that has attained a quiescent, stable state. Therefore, in the event that quiescence should happen to be disturbed (e.g., by floor vibration) during reading of weight data which are to participate in a calculation, the weight data not representing an actual value (i.e., the weight data from a machine which has been disturbed) will be excluded, to preclude a weighing error.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 2:
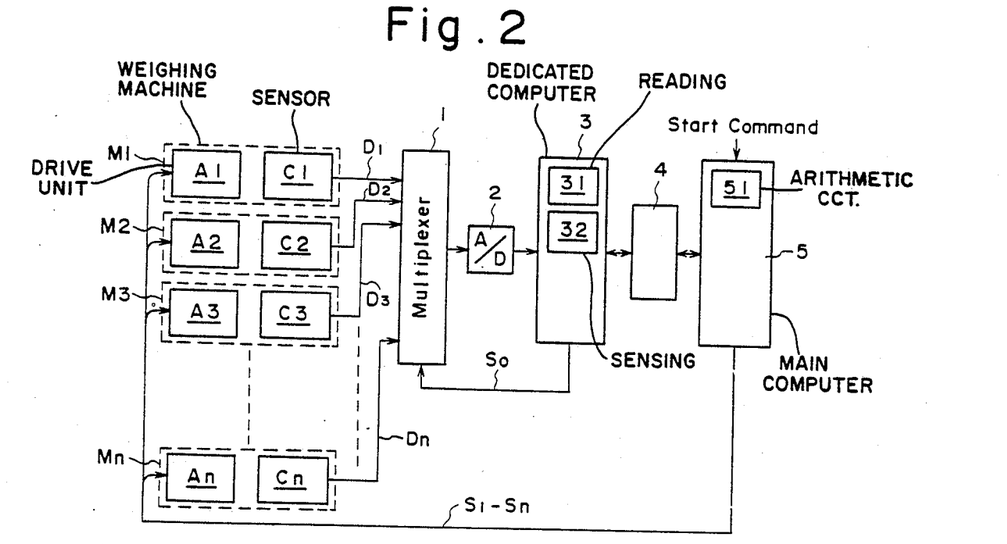
FIG. 2 is a block diagram of the general construction of a control system of a combinatorial weighing apparatus embodying the present invention.

FIG. 2 is a block diagram of the general construction of a principal portion of an embodiment of the present invention. Portions identical with those shown in FIG. 1 are designated by like reference characters. It should be noted that a portion of the control system, from the weighing machines $M_1$-$M_n$ to the A/D converter 2, is deleted from the drawing.

The analog weight data $D_1$-$D_n$ produced by the respective weight sensors $C_1$-$C_n$ of the weighing machines $M_1$-$M_n$, are applied consecutively to the A/D converter 2 via the multiplexer 1, and are converted by the A/D converter 2 into digital signals applied to a computer 3 dedicated to the handling of the weight data. The dedicated computer 3 constantly monitors the weighing state (operating state) of the weighing machines $M_1$-$M_n$ and includes reading means 31 (i.e., a reading circuit) for constantly reading the output data $D_1$-$D_m$ of the weighing machines $M_1$-$M_n$, and sensing the means 32 (i.e., a sensing circuit) for sensing stability of each of the weighing machines.

Whenever output data from each weighing machine is stored to update an older value, the sensing means 32 obtains the mean value of a predetermined number of items of the latest output data over a prescribed period of time. It is determined whether the weighing machine is stable based on a comparison between a preceding mean value (a mean value of a predetermined number of items of output data obtained before a storing and updating operation) and a current mean value.

The dedicated computer 3 is connected to memory means 4 (i.e., memory). As indicated by a data map shown in FIG. 6, the memory means 4 stores, for each and every one of the weighing machines $M_1$-$M_n$, latest output data $W_1$-$W_n$ produced by the respective weighing machines $M_1$-$M_n$, a predetermined number (four in the illustrated embodiment) of items of output data stored by a plurality of sampling operations over a prescribed period of time, and a mean value (weight data) of the predetermined number of items of output data from each weighing machine. Though the memory means 4 ordinarily is under the supervision of the dedicated computer 3, the arrangement is such that the contents of the memory means 4 may be read at will by a main computer 5, described below, whenever necessary. Adopting such a multiprocessing configuration enables the dedicated computer 3 to monitor the weighing state (operating state) of the weighing machines $M_1$-$M_n$ accurately at all times, and enables the main computer 5 to make prompt use of weight data, the reliability of which is enhanced by the mean-value processing.

Figure 6:
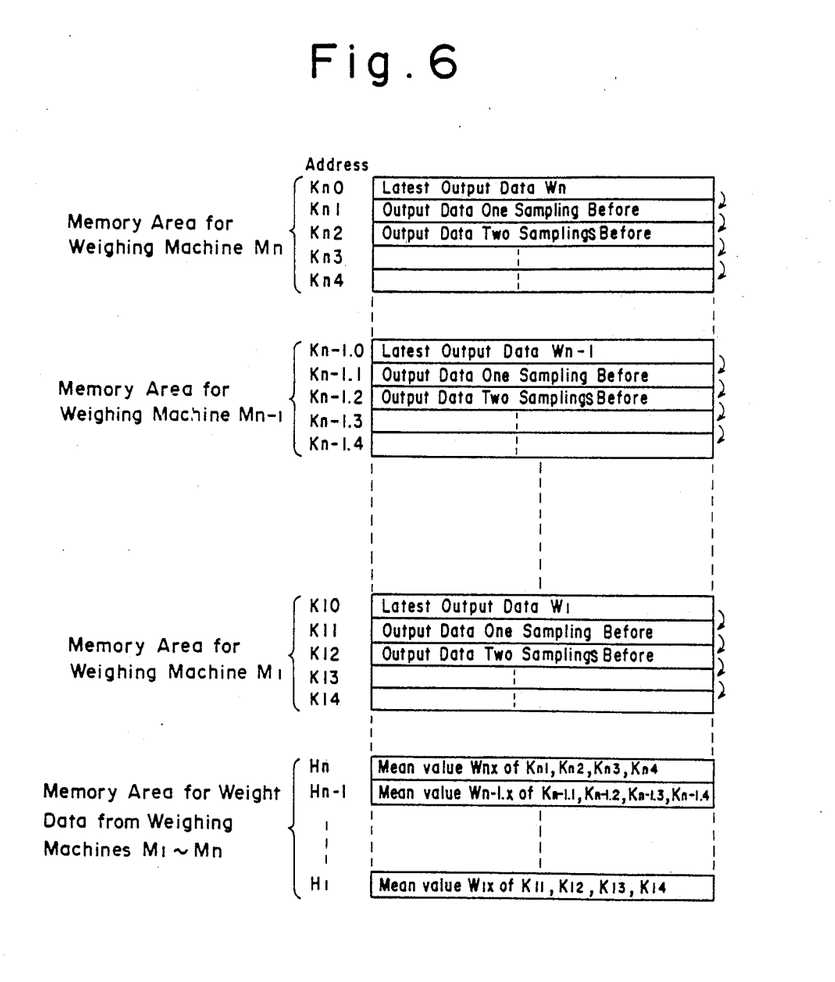
FIG. 6 is an example of a data map of memory means.

The memory means 4 also stores, for each of the weighing machines $M_1$-$M_n$, provisional stability flags which flag provisional stability of each of the weighing machines $M_1$-$M_n$, and stability flags which flag complete stability of each of the weighing machines $M_1$-$M_n$.

The main computer 5 controls the overall apparatus and includes arithmetic means 51 (i.e., an arithmetic circuit). When a start command is issued by a packaging machine, (not shown), the main computer 5 goes to the memory means 4 to read out the weight data from those weighing machines for which a stability flag has been set up, and the arithmetic means 51 combines these items of weight data to obtain an optimum combination thereof, namely a combination giving a total weight equal or closest to a target weight. Even if some of the weighing machines are unstable, therefore, the main computer 5 is capable of executing a combinatorial calculation using weight data from any weighing machines which are stable.

The remaining portions of the apparatus of the illustrated embodiment are of the same construction as the conventional combinatorial weighing apparatus and need not be described in further detail.

The operation of the combinatorial weighing apparatus shown in FIG. 2 will now be described.

Figure 3:
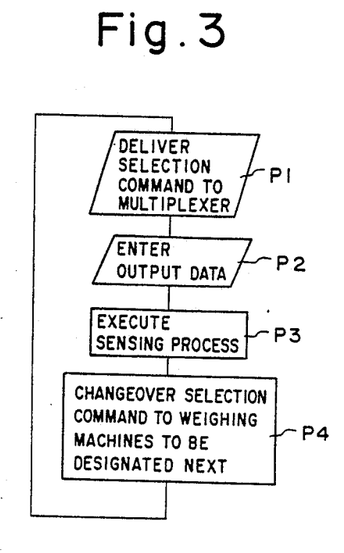
FIG. 3 is a flowchart of an example of a basic operating procedure of a computer dedicated to the handling of weight data.

FIG. 3 is a flowchart of an example of a basic operating procedure of the dedicated computer 3 for dealing with weight data. Steps P1, P2 and P4 of the flowchart are performed by the reading means 31, and step P3 is performed by the sensing means 32.

First, at step P1, the dedicated computer 3 supplies the multiplexer 1 with the selection command $S_o$ designating specific ones of the weighing machines. Next, at step P2, output data from the specific weighing machines (the designated weighing machines) are read following their conversion into digital values by means of the A/D converter 2. The dedicated computer 3 then executes a sensing process, described below, at step P3, upon the completion of which the selection command $S_o$ is changed over at step P4 to those weighing machines to be designated next. The program then returns to step P1, where the changed-over selection command $S_o$ is delivered to the multiplexer 1. The foregoing process steps are repeated, so that the dedicated computer 3 may thus read in the weight data from the weighing machines $M_1$-$M_n$ in successive fashion.

Figure 5:
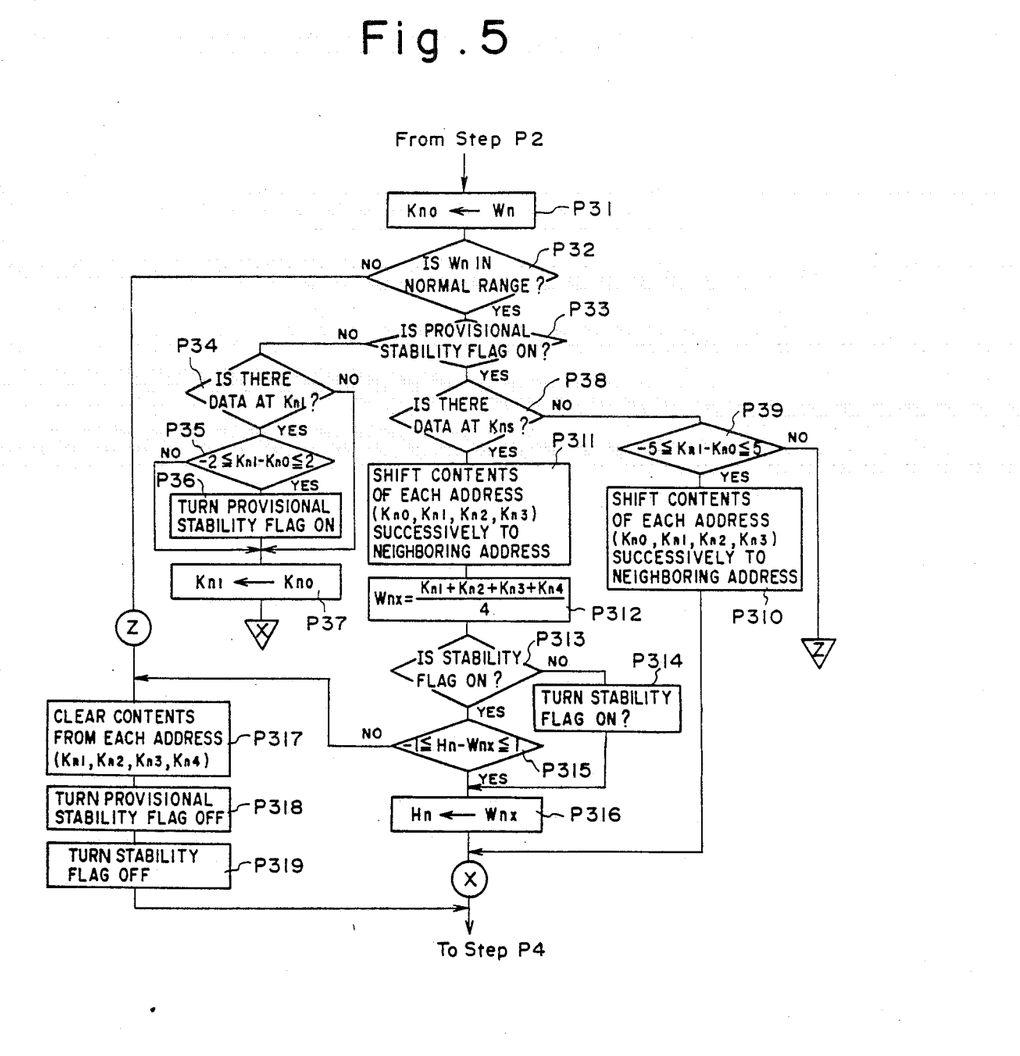
FIG. 5 is a flowchart of the details of step P3 in the flowchart of FIG. 3.

FIG. 5 is a flowchart of the details of step P3 mentioned above. Sensing processing will be described focusing mainly on a single weighing machine $M_n$.

FIG. 6 illustrates an example of a data map of the memory means 4. Assigned to the weighing machine $M_n$ are a memory area which extends from an address $K_{n0}$ to an address $K_{n4}$ for storing the output data, and a memory area $H_n$ for storing a mean value $W_{nx}$, described below.

First, at a step P31, the dedicated computer 3 stores an item of output data $W_n$ (a digital value), received from the weighing machine $M_n$, in the memory means 4 at the address $K_{n0}$. This is followed by a step P32, at which it is determined whether the data $W_n$ lies within a normal range. The range is a normal range if the item of output data $W_n$ lies between a count corresponding to, say, $-5$ grams, and a count corresponding to an over-scale reading (e.g., a count corresponding to the target weight plus an allowable upper limit value). An item of output data which falls outside this range is deemed to be abnormal.

If the decision rendered in step P32 is YES, indicating a normal value, then the dedicated computer 3 executes steps from P33 onward. However, when a NO decision, indicative of an abnormal item of output data, is rendered at step P32, (that is, when the weighing hopper of the weighing machine $M_n$ has been detached or when there is an over-scale reading), the data stored at the addresses $K_{n1}$-$K_{n4}$ of the memory means 4 are cleared at a step P317, a provisional stability flag and a stability flag are removed at steps P318, P319, respectively, and the program moves to the step P4.

On the other hand, if the item of output data $W_n$ from the weighing machine $M_n$ is deemed to be normal at the step P32, the dedicated computer 3 determines at a step P33 whether a provisional stability flag has been set up. If it has, i.e., if an ON decision is rendered, the program moves to a step P38; if it has not, i.e., if an OFF decision is rendered, then the program moves to a step P34.

Under the initial starting conditions, however, the provisional stability flag will be OFF, so that the dedicated computer 3 moves first from the step P33 to the step P34, at which it is determined whether an item of output data is stored at address $K_{n1}$ of the memory means 4. Obviously all of the addresses $K_{n0}$-$K_{n4}$ of the memory means 4 will be clear of data at the beginning of operation, so that the decision at the step P34 will be NO. Initially, therefore, the program moves from the step P34 to a step P37, at which the item of output data stored at address $K_{n0}$ of the memory means 4 is written into the location at address $K_{n1}$. This is followed by moving to the step P4.

Upon execution of the foregoing process steps, the time will again come for processing an item of output data $W_n$ from the weighing machine $M_n$. When this time comes, the item of output data previously read will have been stored at the $K_{n1}$ address of the memory in memory means 4. Therefore, the decision rendered at the step P34 will be YES, so that the program will move to step P35. Here the item of output data previously written into address $K_{n1}$ is compared with an item of output data just read and located at address $K_{n0}$. If the result of the comparison is that the difference ranges between a count of, e.g., $-2$ and $+2$, then a provisional stability flag is set up at a step P36 followed by execution of the process step P37. If the decision at the step P35 is that the difference lies outside the range of $-2$ to $+2$, then the step P36 is bypassed and the step P37 is executed.

When the provisional stability flag is set up, the relevant weighing machine $M_n$ can be regarded as being more or less stable. Therefore, if the main computer 5 reads the item of output data at address $K_{n0}$ or $K_{n1}$ at the instant the provisional stability flag is set up and causes this item of data to participate in a combinatorial calculation, the weighing speed of the overall apparatus can be raised the maximum extent.

After the provisional stability flag has been set up, the time will again come for processing an item of output data $W_n$ from the weighing machine $M_n$. When this time comes, the program moves from the step P33 to a step P38, where it is determined whether an item of output data has been stored at the address $K_{n3}$. Since output data will have been written only up to the address $K_{n1}$ at this time, the decision at the step P38 is NO. This then is followed by a step P39, at which the item of output data stored at address $K_{n1}$ is compared with the item of output data stored at address $K_{n0}$. If the result of the comparison is that the difference between the two values is between a count of, e.g., $-5$ and $+5$, then this may be regarded as indicating that the stable state of the weighing machine $M_n$ is continuing. Therefore, at a step P310, the dedicated computer 3 shifts the contents at the addresses $K_{n0}$ through $K_{n3}$ of the memory means 4 to their immediately neighboring addresses in sequential fashion. More specifically, an item of data at address $K_{n3}$ is shifted to address $K_{n4}$, and an item of data at address $K_{n2}$ is shifted to address $K_{n3}$ sequentially. If the decision at the step P39 is that the difference between the two values is outside the range of counts $-5$ to $+5$, then this is taken as indicating that the quiescent, stable state of the weighing machine $M_n$ has been upset. Consequently, the dedicated computer 3 executes the aforementioned step P317 to clear the contents at all addresses $K_{n1}$-$K_{n4}$ of the memory means 4.

Thus, when it is again time to process the item of output data $W_n$ from the weighing machine $M_n$, the output data are shifted from one address to the neighboring address, so that an item of output data eventually comes to be stored at the address $K_{n3}$. Then, when the time for processing the output data next arrives, the program moves from the step P38 to the step P311, so that the data stored at the addresses $K_{n0}$-$K_{n3}$ are shifted again. In this way items of output data come to be stored at each of the addresses $K_{n1}$-$K_{n4}$ of memory means 4. Next, at a step P312, the dedicated computer 3 obtains the mean value ($W_{nx}$) of the items of output data stored at the addresses $K_{n1}$-$K_{n4}$ of memory means 4. Then, at a step P313, the dedicated computer 3 determines whether a stability flag has been set up. Initially, however, the stability flag will be in the OFF state, so that the decision at step P313 will be NO. In consequence, the program moves to a step P314 where the stability flag is set. Thereafter, at a step P316, the aforementioned mean value $W_{nx}$ is stored at the $H_n$ address of the memory area in memory means 4. When the time for processing an item of output data $W_n$ from the weighing machine $M_n$ next arrives, the step P313 is re-executed. Now the stability flag will be ON so that a YES decision is rendered, with the program then moving from the step P313 to a step P315.

At the step P315, the mean value $W_{nx}$ which has just been calculated anew is compared with the previously calculated mean value, namely the mean value stored at address $H_n$. If the diffference between the two mean values lies between a count of $-1$ and a count of $+1$, this can be regarded as indicating that the weighing machine $M_n$ is still stable. The dedicated computer 3 therefore takes the mean value $W_{nx}$ just calculated anew and stores it at address $H_n$ of the memory area in memory means 4 to update the mean value. This occurs at the step P316. If the decision at the step P315 is that the difference between the two values is outside the count range of $-1$ to $+1$, then this is taken as indicating that the weighing machine $M_n$ is no longer stable. Accordingly, the program moves from the step P315 to the step P317, whereby the dedicated computer 3 clears all of the output data from the addresses $K_{n1}$-$K_{n4}$ of the memory means 4. The program then moves to the step P4 via the steps P318, P319.

The dedicated computer 3 repeats the foregoing processing sequentially for each of the weighing machines $M_1$-$M_n$ to sense the stability of each one, and performs updating by storing the latest mean values $W_{1x}$-$W_{nx}$ for the respective weighing machines $M_1$-$M_n$ when they have attained stability.

Figure 4:
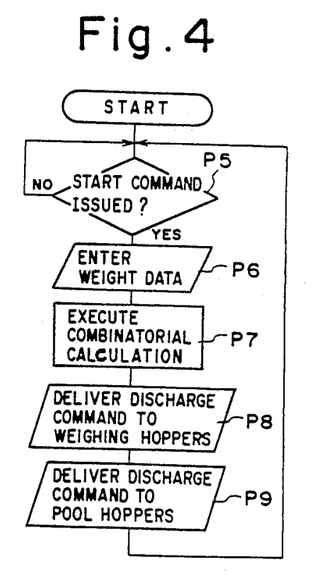
FIG. 4 is a flowchart of in general a basic operating procedure of a main computer.

FIG. 4 is a flowchart of the basic operating procedure of the main computer 5. Step P6 in the flowchart is performed by the arithmetic means 51.

In the flowchart of FIG. 4, the main computer 5 waits for a start command from a packaging machine (not shown) while repeating a step P5. When the start command is issued, the main computer 5 at the step P6 reads, from the memory means 4, weight data (the mean value $W_{nx}$) from the weighing machines for which a flag has been set up. Next, at a step P7, the main computer 5 combines these weight data to obtain the aforementioned optimum combination and, at a step P8, delivers a discharge command to the weighing hoppers of those weighing machines selected by the optimum combination. Then, upon passage of a prescribed period of time, a discharge command is delivered to the pool hoppers (not shown) corresponding to these selected weighing machines. This is step P9 of the flowchart. Thus, the weighing machines selected by the optimum combination release their articles into the packaging machine. These weighing machines, now empty, are then resupplied with articles from the corresponding pool hoppers. The program then returns to the step P5, where the main computer 5 stands by for the next start command.

It should be noted that the present invention is not limited to the embodiment described above but can be modified in various ways within the scope of the claims.

As an example, in the illustrated embodiment the decision concerning the stability of each weighing machine is rendered by obtaining the mean value of a predetermined number of items of the latest output data and then making a judgment based on a comparison between this mean value and a mean value calculated previously. However, an alternative approach would be to obtain the rate of change in the mean value of the output data and render a decision concerning stability based on this rate of change. Further, in the illustrated embodiment, the mean value of a predetermined number of items of output data is treated as weight data. Alternatively, however, a mean value of items of output data that remain following exclusion of maximum and minimum values can be employed as weight data. Also, in the illustrated embodiment, the arrangement is such that an item of weight data from a weighing machine for which a stability flag has been set up is read out of memory and made to participate in a combinatorial calculation. However, an arrangement is also permissible wherein the latest output data from a weighing machine, for which a provisional stability flag has been set up, is read out of memory and made to take part in a combinatorial calculation.

What I claim is:

1. A combinatorial weighing method for performing a combinatorial calculation based on output data from a plurality of weighing machines and for selecting a combination of weight data, corresponding to the output data, indicative of a total combined weight equal or closest to a target value within a preset range, comprising the steps of:
    (a) repeatedly reading output data from each of the weighing machines and storing the output data as plural data items for the respective weighing machines in a weighing cycle shorter than a combinatorial calculation cycle and preset according to the weighing machines supplied with articles to be weighed;
    (b) obtaining the mean value of the plural data items stored for the respective weighing machines, and updating a preceding mean value with the current mean value;
    (c) determining, for each weighing machine, whether the weighing machine is in a stable state based on a comparison between the preceding mean value and the current mean value; and
    (d) performing a combinatorial calculation upon weight data corresponding to the output data from each weighing machine sensed to be in a stable state, in a next combinatorial calculation cycle.

2. A combinatorial weighing method according to claim 1, wherein said steps (a), (b) and (c) are performed by a first computer, and wherein said step (d) is performed by a separate second computer.

3. A combinatorial weighing method according to claim 2, wherein said steps (a), (b), (c) and (d) are performed by operating the first and second computers as a multiprocessing system.

4. A combinatorial weighing apparatus for performing a combinatorial calculation based on output data from a plurality of weighing machines and for selecting a combination of weight data, corresponding to the output data, indicative of a total combined weight equal or closest to a target value within a preset range, comprising:
    reading means for repeatedly reading output data from each of the weighing machines;

memory means for storing, for each weighing machine, a predetermined number of items of the output data read by said reading means, said memory means being adapted to store a predetermined number of items of the most recent output data from each of the weighing machines in a weighing cycle shorter than a combinatorial calculation cycle and preset according to the weighing machines supplied with articles to be weighed;

sensing means for sensing whether each weighing machine is in a stable state based on the predetermined number of items of output data stored in said memory means, said sensing means being adapted to calculate a mean value of the predetermined number of items of the most recent output data from each of the weighing machines whenever an item of output data from a respective weighing machine is stored in said memory means, and to sense whether each weighing machine is in a stable state based on a comparison between a preceding mean value and a current mean value; and arithmetic means for executing a combinatorial calculation upon reading, from said memory means, weight data corresponding to the output data from those weighing machines in a stable state.

5. A combinatorial weighing apparatus according to claim 4, wherein the weight data from each of the weighing machines which participates in the combinatorial calculation is a mean value of a predetermined number of items of the most recent output data from a weighing machine in a stable state.

6. A combinatorial measuring method for use with a plurality of weighing machines which provide output data corresponding to the quantities of a product charged in the weighing machines, comprising the steps of:

(a) repeatedly storing items of the output data from the respective weighing machines in a weighing cycle shorter than a combinatorial calculation cycle and preset according to the weighing machines supplied with articles to be weighed;

(b) continuously monitoring the stored output data to determine which of the weighing machines are in a stable state, said step (b) including substeps of:

(b1) calculating, for each weighing machine, a mean value for a predetermined number of the items of output data most recently stored for the weighing machine whenever an item of the output data from the weighing machine is stored in said step (a); and (b2) determining, for each weighing machine, whether the weighing machine is in the stable state based on a comparison between the preceding calculated mean value for the weighing machine and a current mean value for the weighing machine; and (c) performing a combinatorial calculation upon calculation data, corresponding to the output data from each of the weighing machines which is determined to be in a stable state, to select a combination of the calculation data corresponding to a total value which is within a preset range.

7. A combinatorial measuring method according to claim 6, wherein said step (c) comprises performing the combinatorial calculation using the current mean value for each of the weighing machines which is in the stable state, as the calculation data.

8. A combinatorial measuring method as set forth in claim 6, wherein said step (c) comprises performing the combinatorial calculation using the most recent item of output data from each of the weighing machines which is in the stable state, as the calculation data.

9. A combinatorial measuring method for use with a plurality of weighing machines which provide output data corresponding to the quantities of a product charged in the weighing machines, comprising the steps of:

(a) repeatedly storing items of the output data from the respective weighing machines in a weighing cycle shorter than a combinatorial calculation cycle and preset according to the weighing machines supplied with articles to be weighed;

(b) continuously monitoring the stored output data to determine which of the weighing machines are in a stable state, said step (b) including the steps of:

(b1) calculating, for each weighing machine, a mean value for a predetermined number of the items of output data most recently stored for the weighing machine whenever an item of the output data from the weighing machine is stored in said step (a);

(b2) determining, for each weighing machine, whether the weighing machine is in the stable state based on the rate of change in the mean value from previously calculated mean values for the weighing machine to a current mean value for the weighing machine; and (c) performing a combinatorial calculation upon calculation data, corresponding to the output data from each of the weighing machines which is determined to be in a stable state, to select a combination of the calculation data corresponding to a total value which is within a preset range.

10. A combinatorial measuring method according to claim 9, wherein said step (c) comprises performing the combinatorial calculation using the current mean value for each of the weighing machines which is in the stable state, as the calculation data.

11. A combinatorial measuring method as set forth in claim 9, wherein said step (c) comprises performing the combinatorial calculation using the most recent item of output data from each of the weighing machines which is in the stable state, as the calculation data.

12. A combinatorial measuring method for use with a plurality of weighing machines which provide output data corresponding to the quantities of a product charged in the weighing machines, comprising the steps of:

(a) repeatedly storing items of the output data from the respective weighing machines in a weighing cycle shorter than a combinatorial calculation cycle and preset according to the weighing machines supplied with articles to be weighed;

(b) continuously monitoring the stored output data to determine which of the weighing machines are in a stable state, said step (b) including substeps of:

(b1) excluding, for each weighing machine, the minimum and maximum values of a predetermined number of the most recent items of the output data to obtain remaining items of the output data;

(b2) calculating, for each weighing machine, a mean value for the remaining items of the output data whenever an item of the output data from the weighing machine is stored in said step (a); and (b3) determining whether the weighing machine is in the stable state based on a comparison between a preceding calculated mean value for the weighing machine and a current mean value for the weighing machine; and (c) performing a combinatorial calculation upon calculation data, corresponding to the output data from each of the weighing machines which is determined to be in a stable state, to select a combination of the calculation data corresponding to a total value which is within a preset range.

13. A combinatorial measuring method according to claim 12, wherein said step (c) comprises performing the combinatorial calculation using the current mean value for each of the weighing machines which is in the stable state, as the calculation data.

14. A combinatorial measuring method as set forth in claim 12, wherein said step (c) comprises performing the combinatorial calculation using the most recent item of output data from each of the weighing machines which is in the stable state, as the calculation data.

* * * * *